US011305831B2

(12) United States Patent
Ryschon (10) Patent No.: US 11,305,831 B2
(45) Date of Patent: Apr. 19, 2022

(54) MOBILE PERFORMANCE SYSTEM

(71) Applicant: Yucca Dune, Inc., Loveland, CO (US)

(72) Inventor: Tim Ryschon, Loveland, CO (US)

(73) Assignee: Yucca Dune, Inc., Loveland, CO (US)

( * ) Notice: Subject to any disclaimer, the term of this patent is extended or adjusted under 35 U.S.C. 154(b) by 113 days.

(21) Appl. No.: 16/290,752

(22) Filed: Mar. 1, 2019

(65) Prior Publication Data

US 2019/0193808 A1 Jun. 27, 2019

Related U.S. Application Data

(63) Continuation of application No. 15/393,036, filed on Dec. 28, 2016, now Pat. No. 10,220,908.

(Continued)

(51) Int. Cl.
| | |
|---|---|
| B62J 45/10 | (2020.01) |
| B62K 5/02 | (2013.01) |
| B62M 1/36 | (2013.01) |
| B62K 7/04 | (2006.01) |
| B62K 27/04 | (2006.01) |

(Continued)

(52) U.S. Cl.
CPC ............ *B62J 45/10* (2020.02); *B62K 5/02* (2013.01); *B62K 7/04* (2013.01); *B62M 1/36* (2013.01); *B62K 5/027* (2013.01); *B62K 21/02* (2013.01); *B62K 21/12* (2013.01); *B62K 27/04* (2013.01); *B62K 27/10* (2013.01); *B62M 9/02* (2013.01); *G10G 5/00* (2013.01)

(58) Field of Classification Search
CPC . B62K 5/00; B62K 5/02; B62K 5/023; B62K 7/04
See application file for complete search history.

(56) References Cited

U.S. PATENT DOCUMENTS

| | | | | |
|---|---|---|---|---|
| D60,223 S | * | 1/1922 | Duguid | .................. D12/112 |
| 3,592,487 A | * | 7/1971 | Mansperger | ............. B62K 5/02 |
| | | | | 280/261 |

(Continued)

FOREIGN PATENT DOCUMENTS

| | | | | |
|---|---|---|---|---|
| EP | 3435364 A1 | * | 1/2019 | ............... B62K 7/00 |
| ES | 1144861 U | * | 10/2015 | |
| GB | 2537387 A | * | 10/2016 | ............... B62K 5/02 |

OTHER PUBLICATIONS

U.S. Appl. No. 15/393,036, filed Dec. 28, 2016.
U.S. Appl. No. 62/272,872, filed Dec. 30, 2015.

*Primary Examiner* — Kevin Hurley
(74) *Attorney, Agent, or Firm* — Craig R. Miles; CR Miles P.C.

(57) ABSTRACT

Disclosed herein are embodiments of a mobile performance system, and methods of making and using such a mobile performance system, whereby the mobile performance system includes: a frame; a front wheel coupled to the frame proximate a frame front end; a pair of rear wheels coupled to the frame proximate a frame rear end; a drive mechanism coupled to the frame, the drive mechanism operable to drive travel of the mobile performance system along a travel path; a steering assembly coupled to the frame, the steering assembly operable to steer the mobile performance system along the travel path; and a platform coupled to the frame, the platform adapted to support a performer performing a performance while the mobile performance system travels along the travel path.

20 Claims, 8 Drawing Sheets

Related U.S. Application Data (60) Provisional application No. 62/272,872, filed on Dec. 30, 2015.

(51) Int. Cl.

| | | |
|---|---|---|
| *B62M 9/02* | (2006.01) | |
| *B62K 21/02* | (2006.01) | |
| *B62K 21/12* | (2006.01) | |
| *B62K 27/10* | (2006.01) | |
| *G10G 5/00* | (2006.01) | |
| *B62K 5/027* | (2013.01) | |

(56) References Cited

U.S. PATENT DOCUMENTS

| | | | | |
|---|---|---|---|---|
| 3,598,195 A | * | 8/1971 | Steller | B62K 7/04 |
| | | | | 180/206.1 |
| 3,843,145 A | * | 10/1974 | Templeton | B62M 1/36 |
| | | | | 280/7.15 |
| 3,866,945 A | * | 2/1975 | Bingham | B62K 5/00 |
| | | | | 280/202 |
| 4,111,274 A | * | 9/1978 | King | B60L 58/18 |
| | | | | 180/206.2 |
| 4,183,418 A | * | 1/1980 | Dudas | B60K 1/00 |
| | | | | 180/206.5 |
| D254,968 S | * | 5/1980 | Moore | D12/112 |
| 4,325,448 A | * | 4/1982 | Pivar | B62K 5/02 |
| | | | | 180/215 |
| D268,923 S | * | 5/1983 | Mann | D12/112 |
| 4,386,675 A | * | 6/1983 | Landon | B62K 5/02 |
| | | | | 180/221 |
| D280,890 S | * | 10/1985 | Trudo | D12/112 |
| 4,546,992 A | * | 10/1985 | Swartz | B62K 5/02 |
| | | | | 280/202 |
| D289,273 S | * | 4/1987 | Berger | D12/112 |
| D308,499 S | * | 6/1990 | Berger | D12/112 |
| 5,863,058 A | * | 1/1999 | Jinks | B62K 5/02 |
| | | | | 280/202 |
| 6,158,542 A | * | 12/2000 | Nolet | B62L 3/00 |
| | | | | 180/206.2 |
| 7,419,024 B1 | * | 9/2008 | Tavantzis | A61G 3/061 |
| | | | | 180/210 |
| 7,525,039 B2 | * | 4/2009 | Steele | G10H 3/146 |
| | | | | 84/743 |
| 7,537,233 B2 | * | 5/2009 | Huang | B62J 1/28 |
| | | | | 280/282 |
| 7,748,728 B2 | * | 7/2010 | Dixon | B62K 3/005 |
| | | | | 280/202 |
| 7,954,838 B1 | * | 6/2011 | Long | B62K 7/04 |
| | | | | 280/288.4 |
| 8,113,307 B2 | * | 2/2012 | Holland | B60W 10/02 |
| | | | | 180/65.1 |
| 9,193,415 B1 | * | 11/2015 | Marquez | B62K 5/02 |
| 9,279,580 B2 | * | 3/2016 | Jargiello, III | G10D 13/02 |
| 9,908,578 B2 | * | 3/2018 | Pestritto | G10D 13/00 |
| 2006/0151224 A1 | * | 7/2006 | Vasser | A63B 21/00181 |
| | | | | 180/206.5 |
| 2008/0115995 A1 | * | 5/2008 | Holland | B60T 8/3225 |
| | | | | 180/216 |
| 2008/0283320 A1 | * | 11/2008 | Bowles | A61G 5/047 |
| | | | | 180/210 |
| 2010/0096204 A1 | * | 4/2010 | Mosey | A61G 3/0808 |
| | | | | 180/210 |
| 2013/0074676 A1 | * | 3/2013 | Waitzman, III | G10G 7/005 |
| | | | | 84/421 |
| 2013/0193668 A1 | * | 8/2013 | Decker | B62M 1/36 |
| | | | | 280/261 |
| 2015/0284044 A1 | * | 10/2015 | Ashkenazie | B62K 5/02 |
| | | | | 280/202 |
| 2017/0050694 A1 | * | 2/2017 | Pestritto | B62J 11/00 |
| 2018/0057096 A1 | * | 3/2018 | Ryan | B62K 5/023 |

\* cited by examiner

MOBILE PERFORMANCE SYSTEM

This United States Patent Application is a continuation of U.S. patent application Ser. No. 15/393,036, filed Dec. 28, 2016, now U.S. Pat. No. 10,220,908, issued Mar. 5, 2019, which claims the benefit of U.S. Provisional Patent Application No. 62/272,872, filed Dec. 30, 2015, each hereby incorporated by reference herein.

I. SUMMARY OF THE INVENTION

A broad object of a particular embodiment of the invention can be to provide a mobile performance system, and methods of making and using such a mobile performance system, whereby the mobile performance system includes: a frame; a front wheel coupled to the frame proximate a frame front end; a pair of rear wheels coupled to the frame proximate a frame rear end; a drive mechanism coupled to the frame, the drive mechanism operable to drive travel of the mobile performance system along a travel path; a steering assembly coupled to the frame, the steering assembly operable to steer the mobile performance system along the travel path; and a platform coupled to the frame, the platform adapted to support a performer performing a performance while the mobile performance system travels along the travel path.

Naturally, further objects of the invention are disclosed throughout other areas of the specification, drawings, and claims.

III. DETAILED DESCRIPTION OF THE PREFERRED EMBODIMENTS

Figure 1:
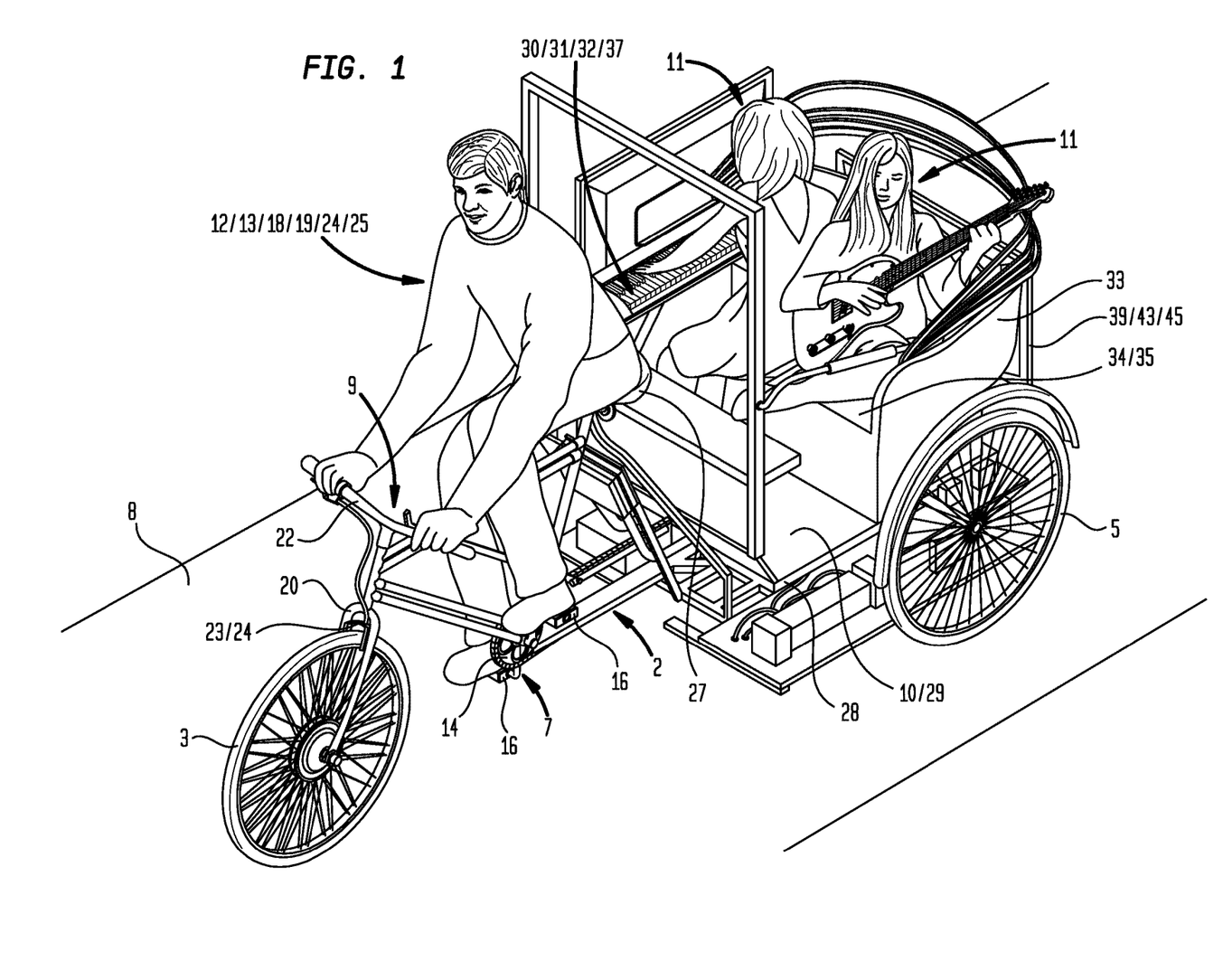
FIG. 1 is an illustration of a method of using a particular embodiment the inventive mobile performance system.
Figure 2:
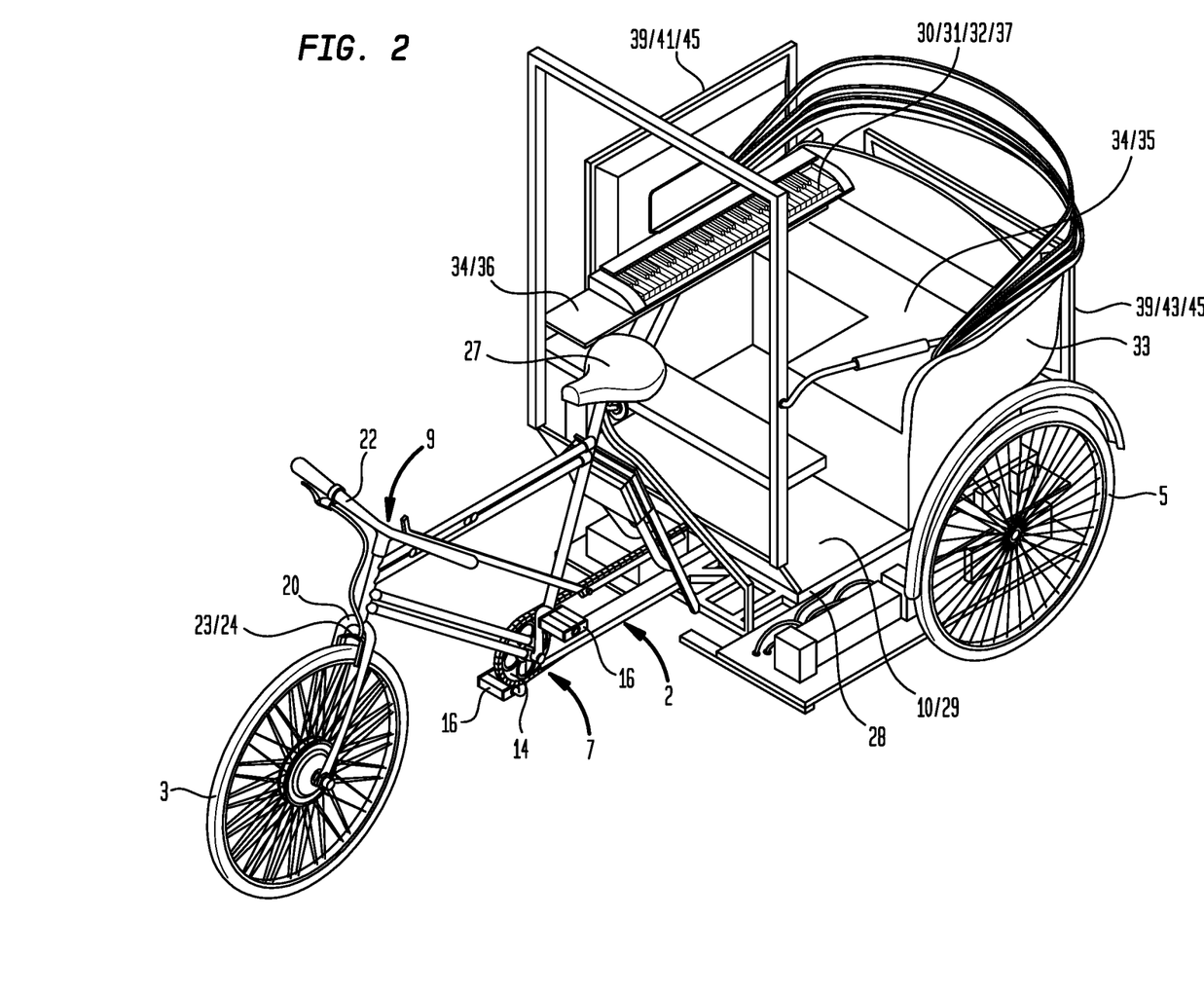
FIG. 2 is a perspective view of a particular embodiment of the inventive mobile performance system.
Figure 3:
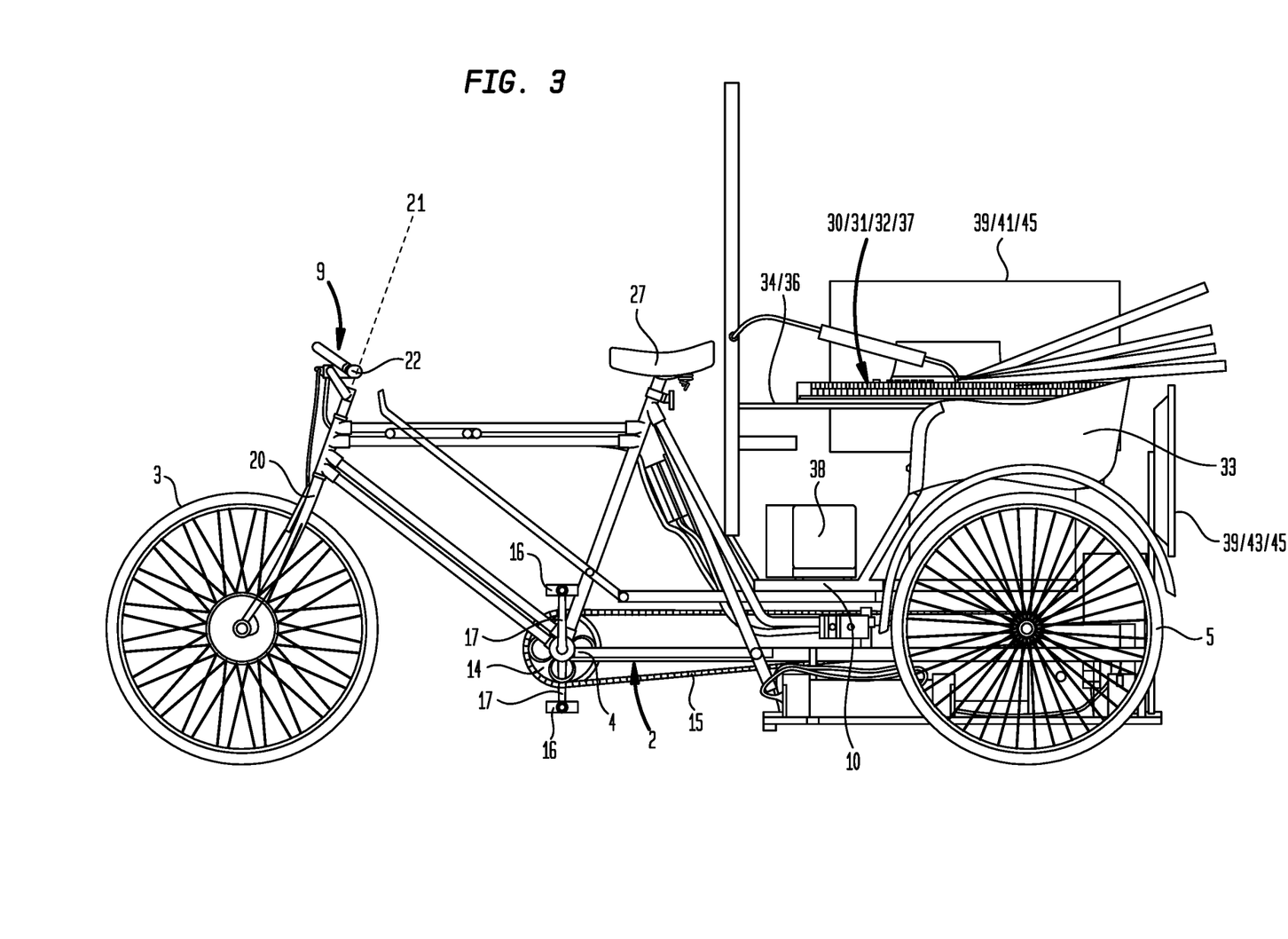
FIG. 3 is a first side view of the particular embodiment of the inventive mobile performance system shown in FIG. 2.

Now referring primarily to FIG. 1, which illustrates a method of using a particular embodiment of a mobile performance system (1) to provide a mobile performance, whereby the mobile performance system (1) includes a frame (2); a front wheel (3) coupled to the frame (2) proximate a frame front end (4); a pair of rear wheels (5) coupled to the frame (2) proximate a frame rear end (6); a drive mechanism (7) coupled to the frame (2), the drive mechanism (7) operable to drive travel of the mobile performance system (1) along a travel path (8); a steering assembly (9) coupled to the frame (2), the steering assembly (9) operable to steer the mobile performance system (1) along the travel path (8); and a platform (10) coupled to the frame (2), the platform (10) adapted to support a performer (11) performing a performance while the mobile performance system (1) travels in the travel path (8). The method of providing the mobile performance includes supporting the performer (11) performing the performance with the mobile performance system (1), and traveling along the travel path (8) while the performance is performed by the performer (11).

For the purposes of this invention, the term "platform" means a supportive surface elevated in relation to a ground surface.

For the purposes of this invention, the term "performance" means an execution of an action. As to particular embodiments, the action can be executed (or performed) for the purpose of entertainment.

For the purposes of this invention, the term "performer" means an executer of an action. As to particular embodiments, the executer can execute the action (or the performer (11) can perform the performance) for the purpose of entertainment.

Now referring primarily to FIG. 2 through FIG. 8, the mobile performance system (1) includes a frame (2), a front wheel (3) coupled to the frame (2) proximate the frame front end (4), and a pair of rear wheels (5) coupled to the frame (2) proximate a frame rear end (6), whereby the pair of rear wheels (5) dispose in spaced apart relation.

Although the particular embodiments of the invention shown in the Figures depict a mobile performance system (1) having one front wheel (3) and one pair of rear wheels (5), the invention need not be so limited, as particular embodiments of the mobile performance system (1) can have any number of front wheels (3) and any number of rear wheels (5), depending upon the application, whereby the front and rear wheels (3)(5) facilitate travel of the mobile performance system (1) along the travel path (8).

Again referring primarily to FIG. 2 through FIG. 8, the mobile performance system (1) further includes a drive mechanism (7) coupled to the frame (2), whereby the drive mechanism (7) is operable to drive rotation of the front wheel (3) and the pair of rear wheels (5), consequently driving travel of the mobile performance system (1) along the travel path (8).

Now referring primarily to FIG. 1, the drive mechanism (7) can be operated by a driver (12), which can be an automatic driver (not shown), a manual driver (13), or combinations thereof, depending upon the application.

For the purposes of the present invention, the term "automatic" means done by a machine, such as an electrically-powered machine.

For the purposes of the present invention, the term "manual" means done by a body, such as a human body.

As to particular embodiments of the mobile performance system (1) having a drive mechanism (7) operated by an automatic driver (not shown), the drive mechanism (7) can include a drive shaft operatively coupled to a transmission and a motor, for example an electric motor.

Again referring primarily to FIG. 1, as to particular embodiments of the mobile performance system (1) having a drive mechanism (7) operated by a manual driver (13), the drive mechanism (7) can include at least one chainring (14) rotatably coupled to the frame (2) between the frame fronts and rear ends (4)(6), and a chain (15) coupled between the chainring (14) and the pair of rear wheels (5), whereby rotation of the chainring (14) drives rotation of the pair of rear wheels (5) via the chain (15) to drive travel of the mobile performance system (1) along the travel path (8).

Now referring primarily to FIG. 2 through FIG. 8, a pair of opposing pedals (16) can be coupled to the chainring (14) via a corresponding pair of opposing crank arms (17) to facilitate driving rotation of the chainring (14) by the manual driver (13), such as a human.

Again referring primarily to FIG. 2 through FIG. 8, the mobile performance system (1) further includes a steering assembly (9) coupled to the frame (2), whereby the steering assembly (9) is operable to steer the mobile performance system (1) along the travel path (8).

Now referring primarily to FIG. 1, the steering assembly (9) can be operated by a steerer (18), which can be an automatic steerer (not shown), a manual steerer (19), or combinations thereof, depending upon the application.

Now referring primarily to FIG. 2 through FIG. 8, as to particular embodiments of the mobile performance system (1) having a steering assembly (9) operated by a manual steerer (19), the steering assembly (9) can include a steering fork (20) pivotally coupled to the frame (2) proximate the frame front end (4). Further, the steering fork (20) can be fixedly coupled to the front wheel (3), whereby pivoting of the steering fork (20) pivots the front wheel (3) about a pivot axis (21) to steer the mobile performance system (1) along the travel path (8).

Again referring primarily to FIG. 2 through FIG. 8, a handlebar (22) can be coupled to the steering fork (20) opposite the front wheel (3) to facilitate steering of the mobile performance system (1) along the travel path (8) by the manual steerer (19), such as a human.

Again referring primarily to FIG. 2 through FIG. 8, the mobile performance system (1) can, but need not necessarily, further include a braking assembly (23), which is operable to arrest travel of the mobile performance system (1).

Now referring primarily to FIG. 1, the braking assembly (23) can be operated by a braker (24), which can be an automatic braker (not shown), a manual braker (25), or combinations thereof, depending upon the application.

Now referring primarily to FIG. 2 through FIG. 8, as to particular embodiments of the mobile performance system (1) having a braking assembly (23) operated by a manual braker (25), the braking assembly (23) can be coupled to at least one wheel (3)(5) and can include brakes (26) which operate via friction upon reception of a braking signal generated by the manual braker (25), such as a human.

Now referring primarily to FIG. 2 through FIG. 8, as to particular embodiments of the mobile performance system (1) having at least one of a drive mechanism (7) operated by a manual driver (13), a steering assembly (9) operated by a manual steerer (19), or a braking assembly (23) operated by a manual braker (25), the mobile performance system (1) can, but need not necessarily, further include a seat element (27) coupled to the frame (2), whereby the seat element (27) is configured to support the manual driver (13), the manual steerer (19), the manual braker (25), or combinations thereof, when correspondingly driving or steering the mobile performance system (1) along the travel path (8) or arresting the mobile performance system (1).

Again referring primarily to FIG. 2 through FIG. 8, the mobile performance system (1) further includes a platform (10) coupled to the frame (2), whereby the platform (10) is adapted to support a performer (11) performing a performance while the mobile performance system (1) travels along the travel path (8). As to particular embodiments, the platform (10) can be coupled to the frame (2) proximate the frame rear end (6), for example between the pair of rear wheels (5).

The platform (10) can be bounded by a platform periphery (28) which can define any of a numerous and wide variety of configurations of varying dimensions, depending upon the application. As shown in the examples of the Figures, the platform periphery (28) can be generally rectangular; however the invention need not be so limited. As additional illustrative examples, the platform periphery (28) can be configured as a circle, an oval, an ellipse, a triangle, a square, a trapezoid, a polygon, a freeform configuration, or the like, or combinations thereof, depending upon the desired shape of the platform (10).

Again referring primarily to FIG. 2 through FIG. 8, the platform (10) can include a platform upper surface (29) which is typically, but not necessarily, substantially planar, on which the performance can be performed by the performer (11). As to particular embodiments, the platform (10) can be configured such that the platform upper surface (29) can support one or more performance components (30) weighing up to about 1000 pounds (about 0.5 tons), whereby performance components (30) can include, as illustrative examples, the performer (11); an instrument (31), such as a musical instrument (32), used by the performer (11) during the performance; or the like; or combinations thereof.

Again referring primarily to FIG. 2 through FIG. 8, the platform (10) can, but need not necessarily, further be bound by at least one platform wall (33) which upwardly extends from the platform upper surface (29). As but one illustrative example, a platform (10) having a generally rectangular platform periphery (28) can be bound by four platform walls (33), each of which at least partially bounds one of the four sides of the generally rectangular platform periphery (28).

Again referring primarily to FIG. 2 through FIG. 8, the platform (10) can, but need not necessarily, further include at least one support element (34) coupled to the platform upper surface (29), whereby the support element (34) is configured to support a performance component (30), such as the performer (11), the musical instrument (32) used by the performer (11) during the performance, or the like, or combinations thereof.

As but one illustrative example, a support element (34) can be configured as a performer support element (35), which can have a substantially planar surface adapted for supporting a performer (11) and particularly, for supporting a performer (11) in a seated position, thus allowing the performer (11) to dispose in a seated position during the performance.

As but a second illustrative example, a support element (34) can be configured as a musical instrument support element (36), such as a musical instrument support element (36) configured to have a substantially planar surface adapted for supporting a keyboard (37) played by a performer (11) during the performance.

Figure 4:
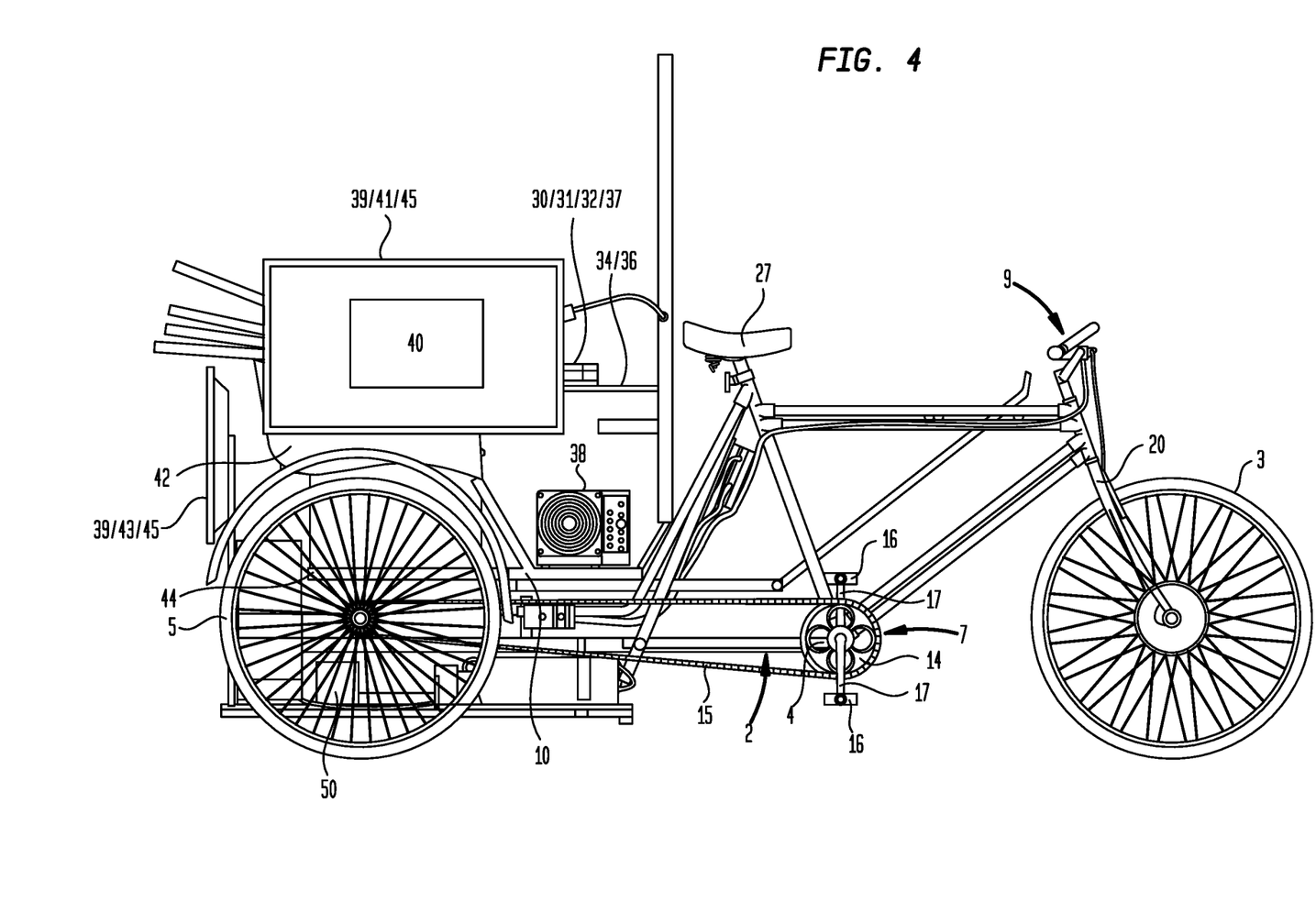
FIG. 4 is a second side view of the particular embodiment of the inventive mobile performance system shown in FIG. 2.
Figure 5:
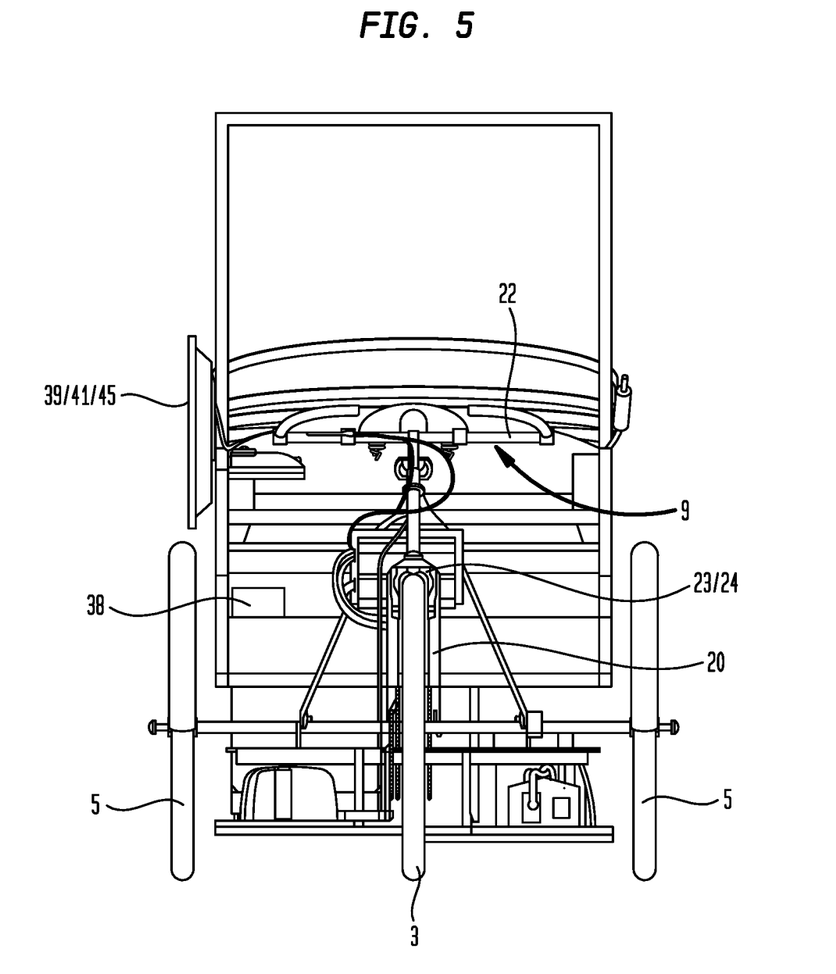
FIG. 5 is a front view of the particular embodiment of the inventive mobile performance system shown in FIG. 2.

Now referring primarily to FIG. 4, the mobile performance system (1) can, but need not necessarily, further include at least one acoustic amplifier (38) coupled to the platform (10), whereby the acoustic amplifier (38) is configured to amplify sound waves generated by the performer (11) during the performance.

Again referring primarily to FIG. 4, the mobile performance system (1) can, but need not necessarily, further include at least one visual display element (39) coupled to the platform (10), whereby the visual display element (39) is configured to display a visual image (40).

As but one illustrative example, a first visual display element (41) can be coupled to the platform (10) proximate a platform first side (42) and a second visual display element (43) can be coupled to the platform (10) proximate a platform rear end (44); however, the visual display element (39) need not be limited to these locations.

As to particular embodiments, the visual display element (39) can be configured to display a visual image (40) associated with the performance. As but one illustrative example, the visual display element (39) can be configured to display a visual image (40) comprising an advertisement. As to particular embodiments, the advertisement can provide information regarding subsequent performances by the performer (11).

As to particular embodiments, the visual image (40) can be an unchanging or static visual image (40).

As to particular embodiments, the visual display element (39) can be configured as an electronic visual display (45), such as a liquid-crystal display (LCD) or a light-emitting diode (LED) display.

As to particular embodiments, the electronic visual display (45) can display a changing visual image (40), which is in contrast to an unchanging or static visual image (40), whereby the changing visual image (40) can be comprised of a plurality of serially-presented visual images (40), such as a series of visual images (40) which may in part or entirely form a motion picture or an animation.

As to particular embodiments, the mobile performance system (1) can, but need not necessarily, further include additional components, such as lighting elements, image capture elements (for example a camera or video recorder), a global positioning system (GPS), or any other component which can be associated with the mobile performance system (1), including the performance performed by the performer (11).

Figure 7:
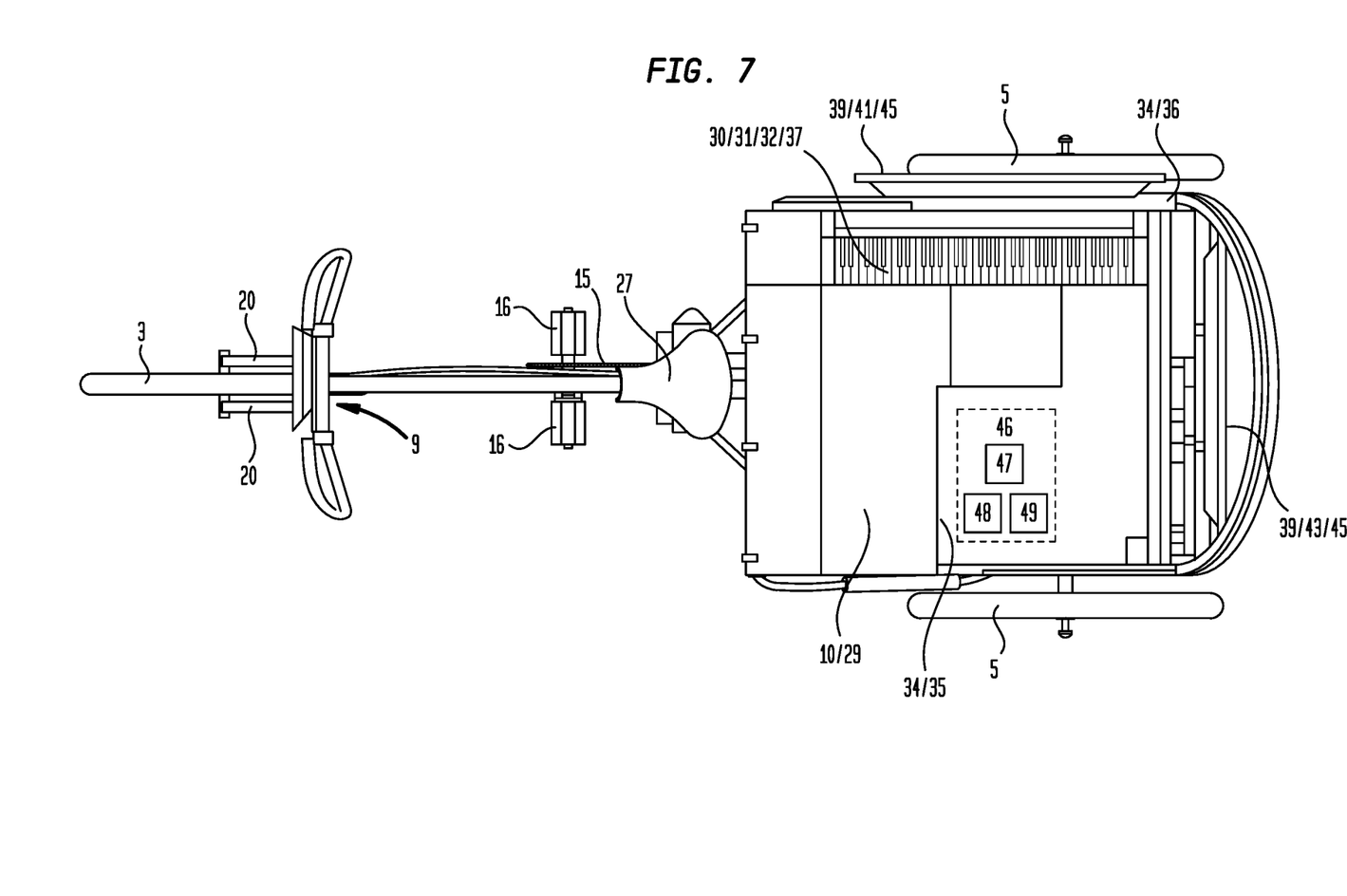
FIG. 7 is a top view of the particular embodiment of the inventive mobile performance system shown in FIG. 2.
Figure 8:
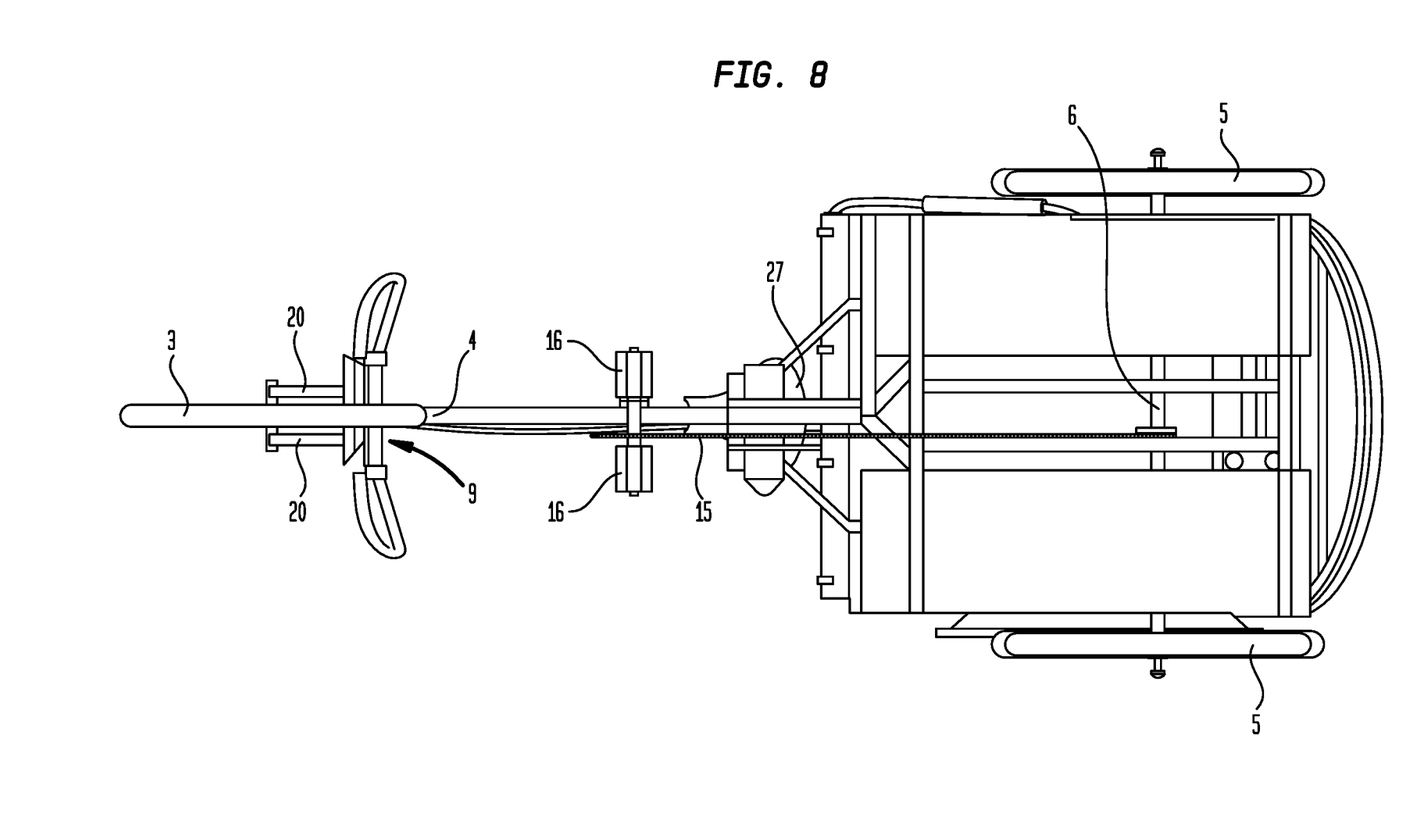
FIG. 8 is a bottom view of the particular embodiment of the inventive mobile performance system shown in FIG. 2.

Now referring primarily to FIG. 7, the mobile performance system (1) can, but need not necessarily, further include a controller (46) operatively coupled to one or more components of the mobile performance system (1), whereby the controller (46) can control the components of the mobile performance system (1). As non-limiting examples, the controller (46) can include computer means (47), networking means (48), and computer-readable media (49) which can be utilized to provide a computer-implemented application program to control the components of the mobile performance system (1).

Figure 6:
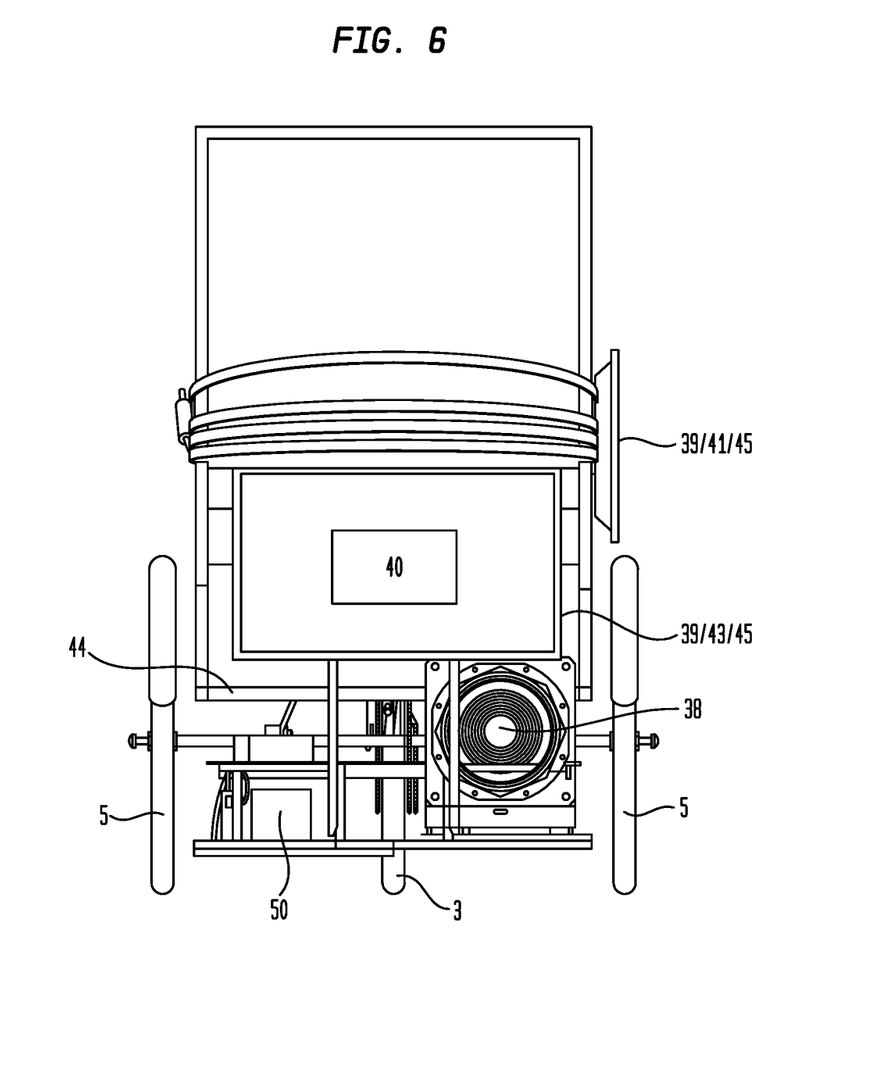
FIG. 6 is a rear view of the particular embodiment of the inventive mobile performance system shown in FIG. 2.

Now referring primarily to FIG. 6, the mobile performance system (1) can, but need not necessarily, further include a power source (50) operatively coupled to one or more components of the mobile performance system (1), whereby the power source (50) can supply power to the components of the mobile performance system (1). As non-limiting examples, the power source (50) can supply power to one or more of: a drive mechanism (7) operated by an automatic driver, a steering assembly (9) operated by an automatic steerer, a braking assembly (23) operated by an automatic braker, a performance component (30) such as an electric musical instrument (32) (such as an electric keyboard (36), an electric guitar, electronic drums, etc.), an acoustic amplifier (38), an electronic visual display (45), a controller (46), or additional components as described above.

As but one illustrative example, the power source (50) can include a battery or a generator, which, as to particular embodiments, can electrically couple to elements such as a breaker, an inverter, a power distribution strip, a charging port, etc.

A method of making a mobile performance system (1) includes providing a frame (2); coupling a front wheel (3) to the frame (2) proximate a frame front end (4); coupling a pair of rear wheels (5) to the frame (2) proximate a frame rear end (6); coupling a drive mechanism (7) to the frame (2), the drive mechanism (7) operable to drive travel of the mobile performance system (1) along a travel path (8); coupling a steering assembly (9) to the frame (2), the steering assembly (9) operable to steer the mobile performance system (1) along the travel path (8); and coupling a platform (10) to the frame (2), the platform (10) adapted to support a performer (11) performing a performance while the mobile performance system (1) travels along the travel path (8).

The method of making the mobile performance system (1) can further include providing additional components of the mobile performance system (1) as described above and in the claims.

The mobile performance system (1) or components of the mobile performance system (1) can be made from any of a numerous and wide variety of materials, depending upon the application. As but one illustrative example, the frame (2) of the mobile performance system (1) can be made from a generally rigid material, such as metal, and the platform (10) can be made from a generally rigid material, such as metal, wood, plastic, etc.

The mobile performance system (1) or components of the mobile performance system (1) can be made from by any of a numerous and wide variety of processes, such as press molding, injection molding, fabrication, machining, printing, additive printing, or the like, or combinations thereof, depending upon the application.

As can be easily understood from the foregoing, the basic concepts of the present invention may be embodied in a variety of ways. The invention involves numerous and varied embodiments of a mobile performance system and methods for making and using such mobile performance systems, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Thus, the applicant(s) should be understood to claim at least: i) each of the mobile performance systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A mobile performance system comprising:
    a frame;
    a front wheel coupled to said frame proximate a frame front end;
    a pair of rear wheels coupled to said frame proximate a frame rear end;
    a manually-powered drive mechanism coupled to said frame, said drive mechanism operable to drive travel of said mobile performance system along a travel path;
    a steering assembly coupled to said frame, said steering assembly operable to steer said mobile performance system along said travel path; and
    a platform coupled to said frame, said platform supporting a performance including a musical instrument while said mobile performance system travels along said travel path.

2. The mobile performance system of claim 1, wherein said drive mechanism comprises:
    a chainring rotatably coupled to said frame; and
    a chain coupled between said chainring and said pair of rear wheels;
    wherein rotation of said chainring drives rotation of said pair of rear wheels via said chain to drive travel of said mobile performance system along said travel path.

3. The mobile performance system of claim 2, further comprising a pair of opposing pedals coupled to said chainring via a corresponding pair of opposing crank arms;
    wherein rotation of said pair of opposing pedals drives rotation of said chainring and correspondingly said pair of rear wheels via said chain to drive travel of said mobile performance system along said travel path.

4. The mobile performance system of claim 1, wherein said steering assembly comprises a steering fork pivotally coupled to said frame and fixedly coupled to said front wheel;

wherein pivoting of said steering fork pivots said front wheel about a pivot axis to steer said mobile performance system along said travel path.

5. The mobile performance system of claim 4, further comprising a handlebar coupled to said steering fork.

6. The mobile performance system of claim 1, further comprising a braking assembly coupled to at least one of said wheels.

7. The mobile performance system of claim 1, further comprising a seat element coupled to said frame.

8. The mobile performance system of claim 1, wherein said platform is coupled to said frame proximate a frame rear end.

9. The mobile performance system of claim 8, wherein said platform is coupled to said frame between said pair of rear wheels.

10. The mobile performance system of claim 1, wherein said platform comprises a platform upper surface which is substantially planar.

11. The mobile performance system of claim 10, wherein said platform is bound by at least one platform wall which upwardly extends from said platform upper surface.

12. The mobile performance system of claim 10, further comprising a support element coupled to said platform upper surface;
wherein said support element is configured to support a performance component.

13. The mobile performance system of claim 12, wherein said support element is configured as a performer support element adapted for supporting said performer in a seated position while said mobile performance system travels along said travel path.

14. The mobile performance system of claim 12, wherein said support element is configured as a musical instrument support element.

15. The mobile performance system of claim 14, wherein said musical instrument support element is configured to support a keyboard.

16. The mobile performance system of claim 1, further comprising at least one visual display element coupled to said platform;
wherein said visual display element is configured to display a visual image.

17. The mobile performance system of claim 16, wherein said visual display element displays an unchanging visual image.

18. The mobile performance system of claim 16, wherein said visual display element displays a changing visual image.

19. A mobile performance system comprising:
a frame;
a front wheel coupled to said frame proximate a frame front end;
a pair of rear wheels coupled to said frame proximate a frame rear end;
a manually-powered drive mechanism coupled to said frame, said drive mechanism operable to drive travel of said mobile performance system along a travel path;
a steering assembly coupled to said frame, said steering assembly operable to steer said mobile performance system along said travel path;
a platform coupled to said frame, said platform adapted to support a performer performing a performance while said mobile performance system travels along said travel path;
a musical instrument support element coupled to said platform; and
a keyboard supported by said musical instrument support element.

20. A mobile performance system comprising:
a frame;
a front wheel coupled to said frame proximate a frame front end;
a pair of rear wheels coupled to said frame proximate a frame rear end;
a manually-powered drive mechanism coupled to said frame, said drive mechanism operable to drive travel of said mobile performance system along a travel path;
a steering assembly coupled to said frame, said steering assembly operable to steer said mobile performance system along said travel path;
a platform coupled to said frame, said platform adapted to support a performer performing a performance while said mobile performance system travels along said travel path; and
at least one acoustic amplifier coupled to said platform;
wherein said acoustic amplifier is configured to amplify sound waves generated by said performer during said performance.

* * * * *